Aug. 19, 1952  J. R. CLARK ET AL  2,607,551
CABIN LOCKING AND ACTUATING MECHANISM
Filed June 8, 1948  4 Sheets-Sheet 1

INVENTOR.
John R. Clark
Roland Christy
BY M. B. Tasker
ATTORNEY

Aug. 19, 1952  J. R. CLARK ET AL  2,607,551
CABIN LOCKING AND ACTUATING MECHANISM
Filed June 8, 1948  4 Sheets-Sheet 2
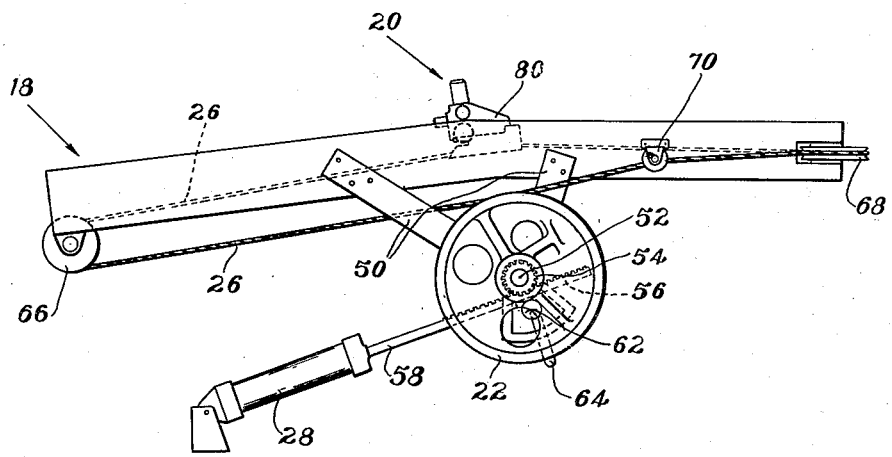
_Fig. 2_
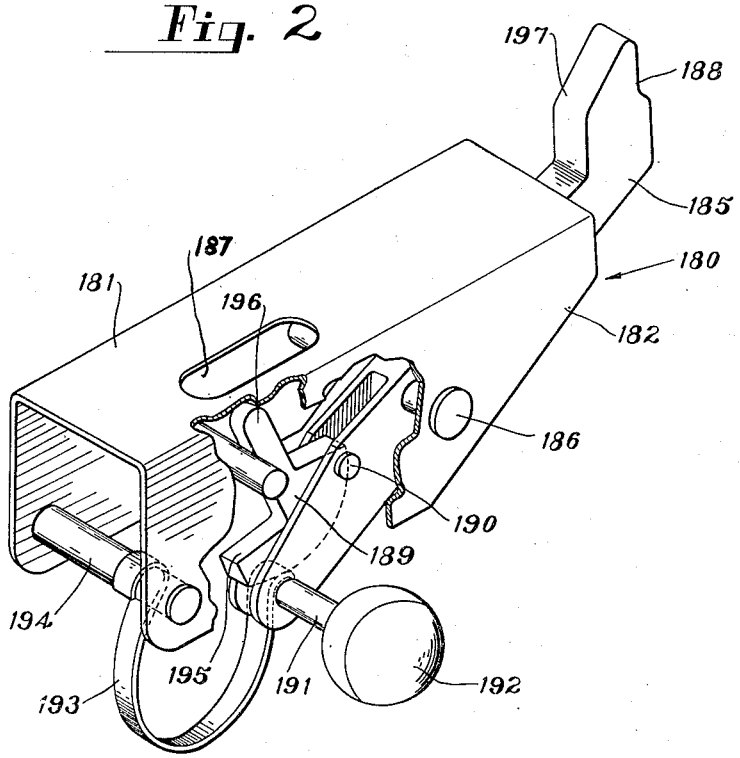
_Fig. 7_
INVENTOR.
John R. Clark
BY Roland Christy
M. B. Tasker
ATTORNEY

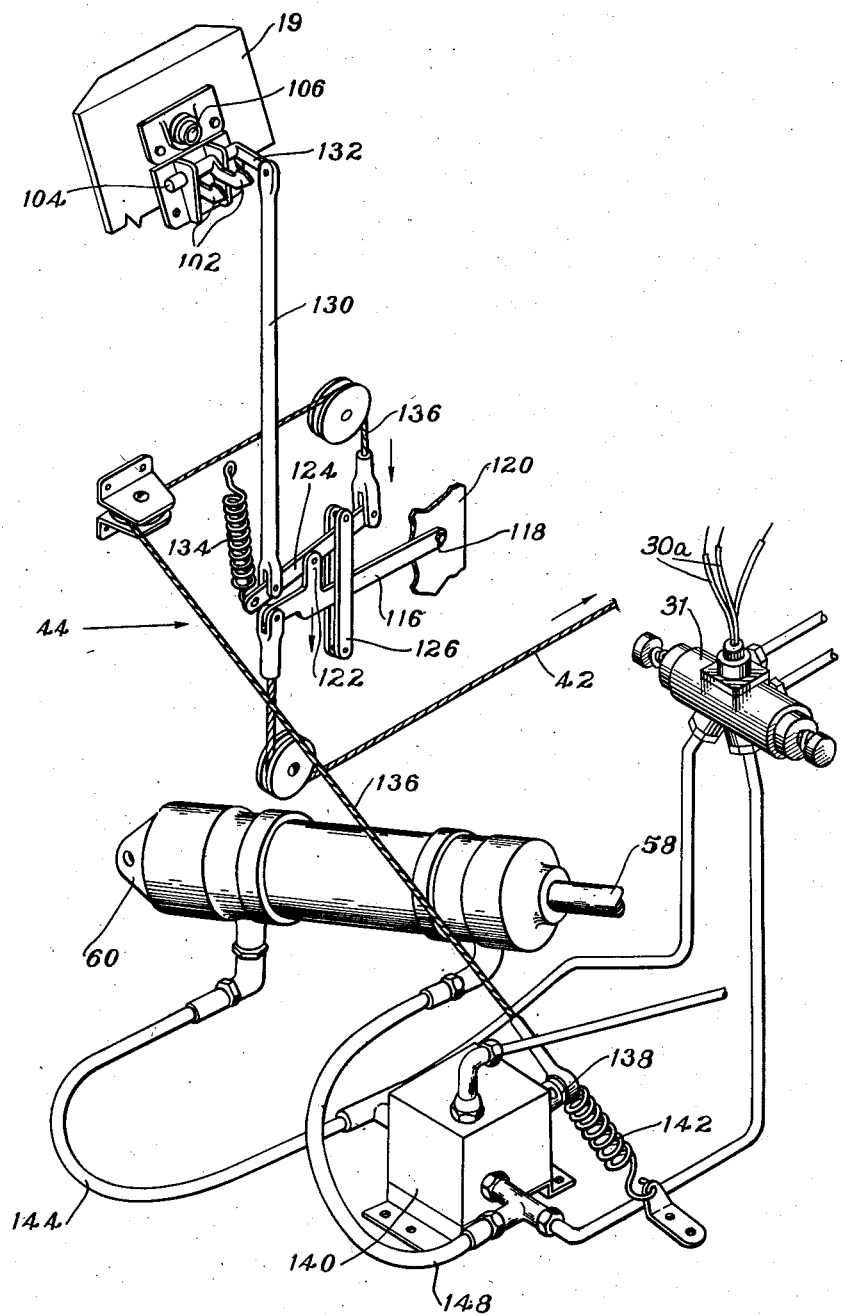

Aug. 19, 1952     J. R. CLARK ET AL     2,607,551
CABIN LOCKING AND ACTUATING MECHANISM
Filed June 8, 1948     4 Sheets-Sheet 4
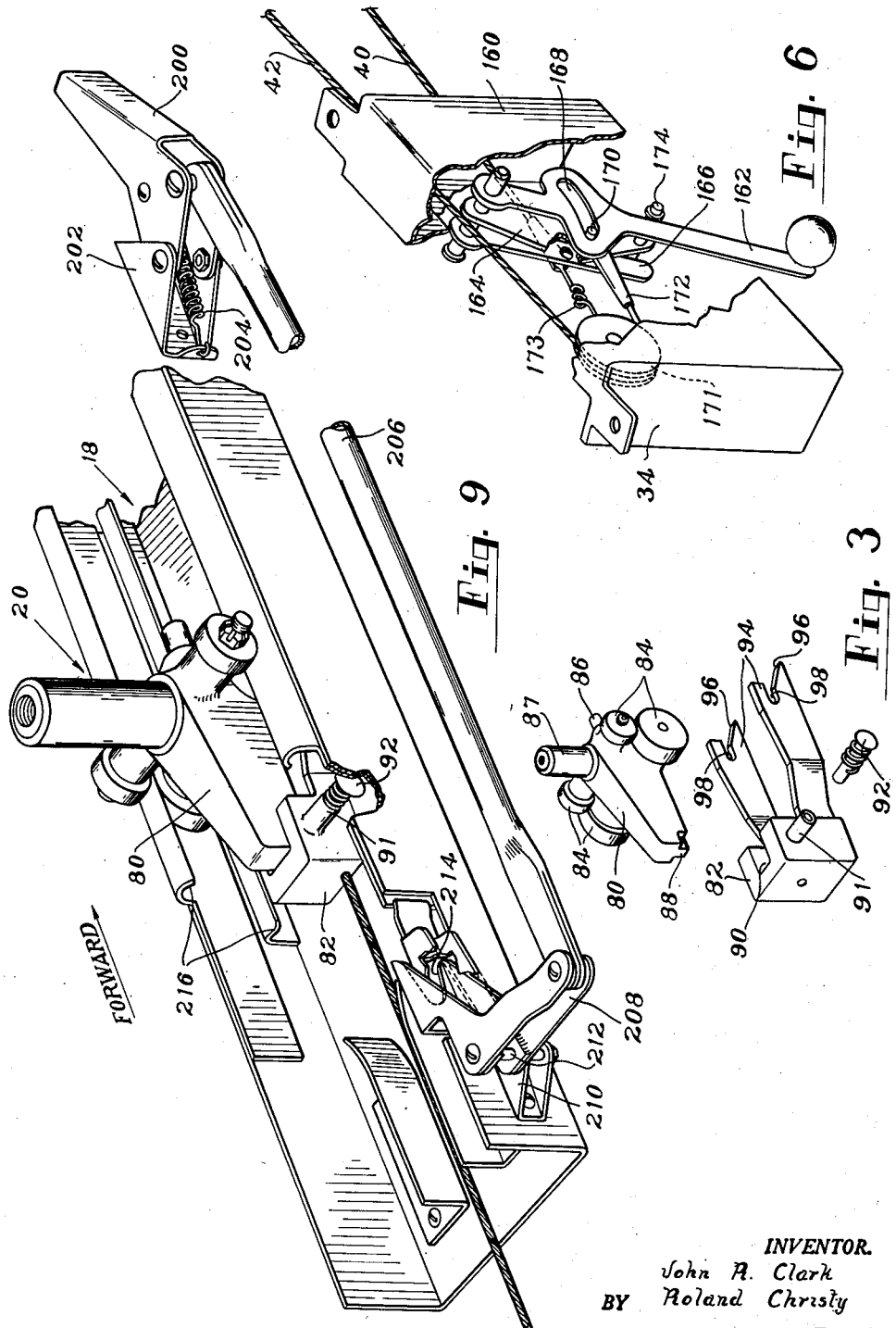
INVENTOR.
John R. Clark
BY Roland Christy
M. B. Tasker
ATTORNEY Patented Aug. 19, 1952

2,607,551

UNITED STATES PATENT OFFICE 2,607,551

CABIN LOCKING AND ACTUATING MECHANISM

John R. Clark, Stratford, and Roland Christy, Milford, Conn., assignors to United Aircraft Corporation, East Hartford, Conn., a corporation of Delaware Application June 8, 1948, Serial No. 31,792

6 Claims. (Cl. 244—121)

This invention relates to airplanes and particularly to cockpit and cabin sliding enclosures and improvements in mechanisms for operating the same.

It is an object of this invention to provide an improved sliding enclosure for airplane cabins and cockpits which can be manually or power operated by the pilot.

Another object of this invention resides in providing a sliding cockpit enclosure with a mechanism which permits manual or power operation of the canopy and also permits the canopy to be positively locked in the fully open or closed positions.

Another object of this invention is to provide an improved mechanism and sliding enclosure for an airplane which permits the enclosure to be held in any intermediate point between the fully open and closed positions.

A still further object of this invention is to provide a power operated sliding canopy for an airplane in which the power means can be made inoperative in order to permit manual movement of the canopy.

A still further object of this invention is to provide a safety latch for the closed position of a cockpit sliding enclosure which must be manually released before the canopy can be hand operated but which is automatically released upon use of power to open the enclosure.

A further object of this invention is to provide a cockpit canopy open position safety latch in combination with the foregoing, the open position safety latch being manually releasable for either power or hand movement of the enclosure.

These and other objects of this invention will become readily apparent from the attached drawings and the detailed description thereof.

In these drawings:

Fig. 2 is a side elevation of the track mechanism including the cockpit canopy carrier and power mechanism for moving the latter;

Fig. 3 is a detailed perspective view of the components of a canopy carrier assembly;

Fig. 4 is a detailed perspective view of the canopy carrier and indicates its engagement with the safety latch which holds the canopy in the closed position;

Fig. 5 is a partial perspective view indicating the mechanism for disabling the power operating mechanism for permitting manual movement of the canopy including the lever system for manually unlocking the closed position safety latch;

Fig. 6 is a detailed perspective view of the pilot's control handle and connecting mechanism for selecting the power or manual operation for the canopy;

Fig. 7 is a detailed perspective view of the canopy full open position safety latch;

Fig. 8 is a schematic diagram indicating the forces acting on the canopy carrier to automatically release the canopy closed position safety latch upon power movement of the canopy toward the open position; and Fig. 9 is a detailed perspective view showing the mechanism for unlocking the canopy so that it can be removed from the airplane.

Figure 1:
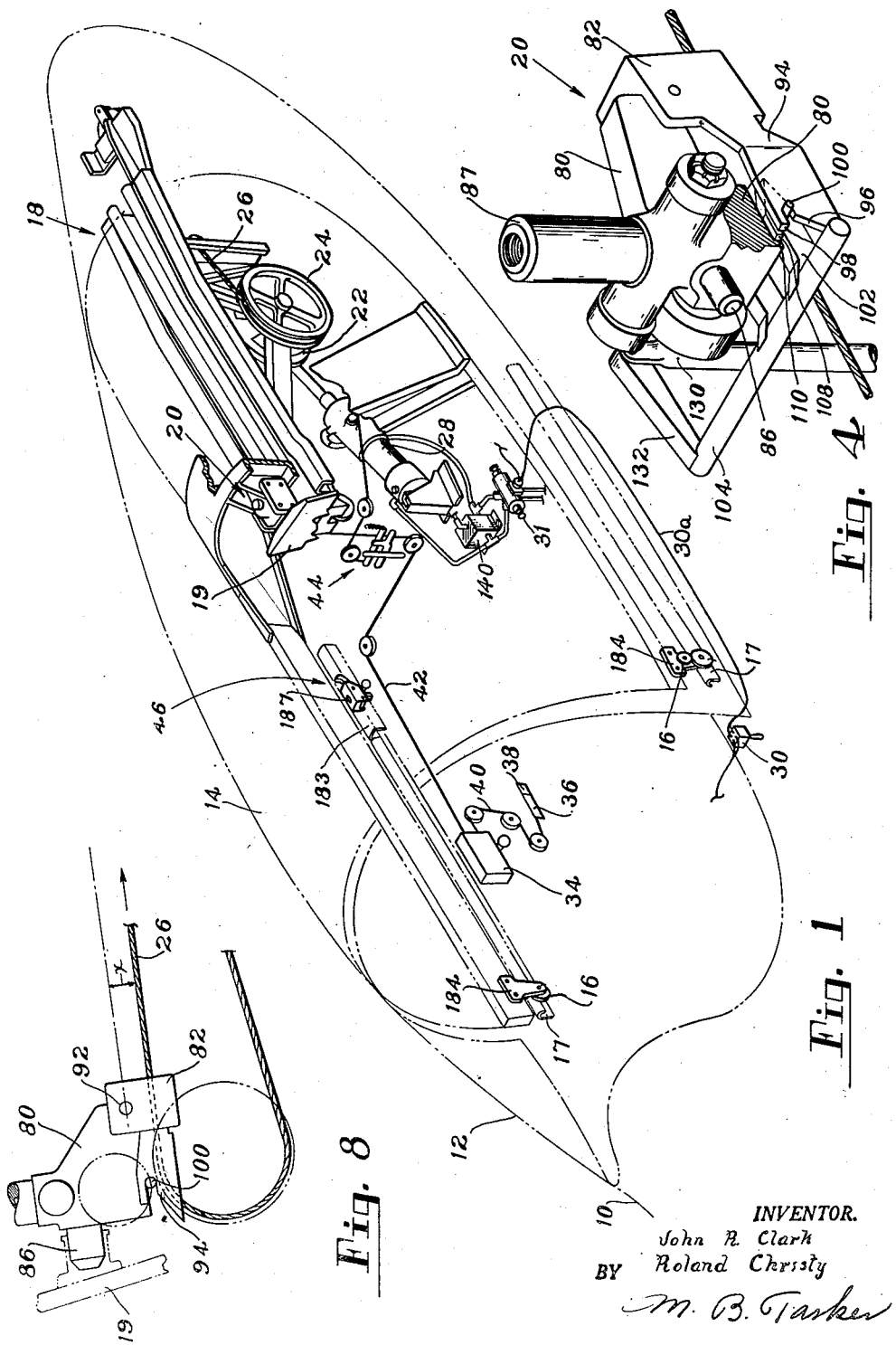
Fig. 1 is a perspective view of an airplane cockpit and indicates generally the operating mechanism according to this invention.

Fig. 1 indicates the cockpit section of an airplane fuselage 10 having a windshield 12 and a sliding enclosure or canopy 14. The canopy is mounted to the airplane structure on each side of its forward end by means of pairs of rollers 16 which engage the tracks 17 longitudinally disposed on each side of the cockpit section. The canopy is also attached at a point along a longitudinal center line and intermediate its fore and aft ends to the double track assembly 18 by the canopy carrier generally indicated at 20. The canopy carrier 20 is slidable along the track assembly 18 thereby permitting the canopy to be rolled fore and aft to open and close the cockpit. The track assembly 18 is normally attached at its aft end to the airplane structure and at its forward end to the plate fitting 19 which in turn is bolted to the rear face of the pilot's armor plate (not shown).

A pair of cable drums 22 and 24, each of which carries one end of the actuating cable 26, can be power rotated by the hydraulic actuating piston assembly 28 in order to move the canopy carrier 20 fore and aft, the canopy carrier being securely fastened to the actuating cable 26. A two-way electrical switch 30 located in the cockpit may be connected by electrical conductors 30a to a solenoid valve 31 or other fluid controlling device for directing pressure to either side of the actuating piston 28 to produce motion in the desired direction. A selective control 34 for permitting power or manual operation of the canopy is located on the right-hand side of the pilot's compartment. A handle 36 is provided on the outer surface of the cockpit for remotely moving the selective control from the outside of the airplane. This handle 36 is spring biased flush with the outer skin of the airplane, being held in this position by a latch 38. Pushing in on the latch 38 causes the handle 36 to spring outwardly thus permitting the pilot or ground handlers to grasp and rotate the handle. Movement of the handle 36 causes the cable 40 in turn to operate the selective control 34. A more detailed description of this control mechanism will follow hereinafter. However, for purposes of clarity at this point in the description, operation of the control 34 moves the cable 42 which, via the mechanism generally indicated at 44, operates a by-pass valve thereby allowing free circulation of fluid between either side of the actuating piston 28 for permitting manual operation of the canopy. The mechanism 44 functions in such a manner so as to simultaneously release a canopy closed position safety latch which is mounted on the aft side of the plate fitting 19.

A canopy full open position safety latch 46 which is mounted on one of the tracks 17 automatically locks the canopy in the full open position and prevents forward movement in case of jars or hard landings and the like. The aft position safety latch must be manually released by the pilot before the canopy can be moved forward by hand or power. The operation of the safety latches for the canopy full open and closed positions will be described hereinafter.

Referring now to Fig. 2, the track assembly 18 carries the bracket assembly 50 to which is attached the drum mounting shaft 52. The cable drum 22 and the drum 24 are rigidly attached to the shaft 52 as is the pinion 54. A rack 56 normally engages the pinion 54 and is integral with the extensible arm 58 which is reciprocated by the hydraulic actuating piston assembly 28. An eccentric shaft 62 is also carried by the bracket 50 and carries a fixed handle 64. Rotation of the handle 64 about the center of the eccentric shaft 62 permits disengagement of the rack 56 from the pinion 54. The actuating cable 26, whose ends are oppositely wound on each of the drums 22 and 24, is aligned along the center line of the track assembly 18 by the fore and aft pulleys 66 and 68, respectively, and also the guide pulley 70. The canopy carrier assembly 20 rides on the track 18 and is affixed to the cable 26. It is apparent then that operation of the actuating piston 28 will cause linear motion of the rack 56 thereby rotating the pinion 54 and the drums 22 and 24 to move the canopy carrier assembly 20 which in turn, being connected to the canopy 14, will impart motion to the latter.

The canopy carrier 20, as seen better in Fig. 3, consists of an upper roller assembly 80 and a lower cable attaching fitting 82. The upper roller assembly 80 carries two sets of rollers 84 on each side thereof which engage the track 18. A plug 86 protrudes forwardly from the center of the roller assembly 80 for engagement with an aperture on the aft side of the plate fitting 19 when the canopy is in the fully closed position. An upstanding cylindrical portion 87 on the assembly 80 provides the main connection between the canopy proper and the operating mechanism while the aft end of the roller assembly 80 contains a horizontally apertured tongue 88 which engages the groove 90 in the cable fitting 82. A protruding guide sleeve 91 on the cable fitting 82 receives a spring loaded pin 92 which enters the aperture and normally holds the tongue 88 within the groove 90 thereby forming a pivot connection between the roller assembly 80 and the cable fitting 82. The pin 92 is biased toward a disengaged position with the guide sleeve 91 thus causing the pinhead to constantly engage the side of the track 18.

In addition, the cable fitting 82 contains two forwardly diverging flanges 94 which at their forward ends contain the sloped surfaces 96 and the slots 98. The slots 98, as seen in Fig. 4, engage the pins 100 on the hooks 102 which protrude from the shaft 104 and form the safety latch for holding the canopy in the closed position. At the same time that the cable attaching fitting engages the hooks 102 the plug 86 enters the aperture 106 of the fitting 19, better seen in Fig 5.

In operation, as the canopy carrier 20 approaches the extreme forward or closed position, the pins 100 on the hooks 102 abut the sloping surfaces 96 (Fig. 4) on the flanges 94 thereby causing the pins 100 to raise the hooks 102 so that the step portion 108 on the hooks 102 are forced into locking engagement with the sears 110 on the lower surface of the roller assembly 80. Since the canopy 14 is fixed to the upstanding cylindrical portion 87 of the roller assembly 80 it will also be locked in the forward position by the safety locking mechanism just described.

The hooks 102 are mechanically releasable for manual movement of the canopy toward the open position by operation of the selective control 34 in the pilot's cockpit or by movement of the handle 36 which is located on the outer skin surface of the cockpit. As previously mentioned, movement of the selective control operates the cable 42, now seen in Fig. 5. The cable 42 connects with the free end of the arm 116 which is pivotally connected at 118 to the pilot's armor plate or to the airplane structure 120. The arm 116 carries an upstanding ear 122 which is pivotally attached to the link 124 intermediate the ends of the latter. A bifurcated guide member 126 straddles both the arm 116 and the link 124 to prevent misalignment and limit the relative movement between the arm and the link. A rod 130 interconnects one of the free ends of the link 124 to the crank 132 which is rigidily attached to the shaft 104 and its integral hooks 102. The rod 130 is normally held in the upper position by the spring 134. The other free end of the link 124 has a connection to the cable 136 which controls the lever 138 on a by-pass valve 140. A spring 142 having identical characteristics with that of the spring 134 normally biases the lever 138 in a position which keeps the by-pass valve 140 closed.

The by-pass valve 140 when in its open position permits trapped hydraulic fluid to circulate between the hydraulic lines 144 and 148 so that the shaft 58 of the actuating piston 28 can be freely moved fore and aft. This operation, it will be evident, permits the rack 56 (Fig. 2) also to move freely so that the canopy which is connected to the canopy carrier 20 can be moved manually fore and aft.

It will be noted that when the cable 42 is pulled in the direction of the arrow in Fig. 5, the pivot arm 116 is moved downwardly thereby causing the entire link 124 also to move downwardly. This in turn causes simultaneous movement of the cable 136 which opens the by-pass valve 140 and also causes downward movement of the rod 130 which rotates the crank 132 and the shaft 104 to lower the step portions 108 of the hooks 102. Should these step portions be in the position shown in Fig. 4, they will be disengaged from the sears 110 on the roller assembly 80 thereby freeing the latter to permit the aft movement of the canopy.

As previously mentioned, the operation of the by-pass valve and the latch release mechanism is controlled via the cable 42 by the selective control 34 in the pilot's compartment. This unit, as seen in Fig. 6, consists of a shaft 160 to which is pivotally connected the control handle 162, the link 164 and the arm 166. The control handle 162 contains an arcuate slot 168 which receives a pin 170 rigidly affixed to the link 164. The end of the cable 42 runs over the pulley 171 and is connected to the link 164 by the cable fitting 172 which in turn is connected directly to the pin 170. It is then apparent that when the pilot moves the handle 162 from the power to the manual position (aft from the position shown in Fig. 6) the pin 170, which is engaged with the forward end of the slot 168, will be moved rearwardly thereby moving the cable 42. The cable 40 which is operated by the handle 36 on the outer skin surface of the cockpit is attached to the arm 166 intermediate the ends of the latter and is biased into a forward position by the spring 173. When the handle 36 is moved, the cable 40 is pulled aft thereby rotating the arm 166 against the tension of spring 173 so that the free end of the arm 166 engages the pin 174 which is rigidly affixed as a cross bar member to the free end of the link 164. Further movement of the cable 40 will cause rotation of the link 164 and correspondent movement of the cable 42. It will be noted that operation of the handle 36 will not move the handle 162 since the pin 170 is permitted to slide freely in the arcuate slot 168. Immediately upon release of the handle 36, the spring 173 will return the controls to the Fig. 6 position.

As previously described in connection with Fig. 1 the open position safety lock mechanism 46 is mounted on the track 17 which extends along the right-hand cockpit wall. As shown more clearly in Fig. 7 the lock 46 includes an inverted channel shaped bracket generally indicated at 180 which is secured by suitable bolts (not shown) to the track 17. The bracket 180 has a web 181 and depending downwardly disposed parallel flanges 182, which are connected to a member 183 attached to the lower portion of track 17. The member 183 locates bracket 180 and the lock actuating mechanism carried thereby so that it lies beneath the level at which the rollers 16 and brackets 184 normally travel as the canopy is moved to the fully open position. The locking mechanism further includes a stop member, or lever 185 located between flanges 182 which is fulcrumed intermediate its ends on a pin 186 supported in flanges 182. Stop member 185 extends aft of bracket 180 above the web 181 and through a passage in track 17 into a position in which its upstanding end is in front of rollers 16 when the canopy 14 is in its full open position. In this position the canopy 14 is positively locked in the open position by the engagement of rollers 16 with the abutment face 188 of lever 185.

The stop lever 185 is bifurcated at its forward end to receive a trip member 189 pivoted on a pin 190 fixed in lever 185 and also carries a rigid shaft 191 which projects inwardly into the cockpit and is provided with a knob 192 on its innermost end in a position to be easily grasped by the pilot. A flat tension spring 193 extends between the furcations of lever 185 and is pivotally attached to shaft 191 by having its end coiled about the section of shaft 191 which extends between these furcations. The other end of spring 193 is coiled about a pin 194 which extends between the depending flanges 182 of bracket 180. It will be noted that the axis of the shaft 191 in the down, or locking position, of knob 192 (shown in Fig. 7) is located below a straight line connecting pins 186 and 194, whereas the shaft 191 will lie above this line between pins 186 and 194 when the knob is moved upwardly to retract the lever 185. Thus, it will be evident that the spring 193 acts to hold the lever 185 in its up or down position, whenever it is moved into either position by the knob 192.

The lock mechanism is also provided with a trip lever 189 having a forwardly extending toe 195 which overlies the coiled end of spring 193 on shaft 191 and an upstanding trip lever 196 which in the down position of knob 192 is depressed below the web 181. In the up position of knob 192 the trip lever 196 projects through the aperture 187 in the web 181 into a position in which it can be engaged by the rollers 16 of bracket 184.

In operation then when the canopy is moved toward the full open position the rollers 16 move along track 17 until the lowest roller strikes face 197 of lever 185. The roller forces lever 185 down but does not depress the lever below a point sufficiently to raise the shaft 191 above the imaginary line between pin 194 and 186; consequently, the lever 185 will be returned to an upstanding position by the spring 193 after the rollers have passed completely over abutment face 197. When the lever 185 is again upstanding its aft blocking face 188 is in an engaging position and will block the rollers 16 if they tend to move forward.

In order to move the canopy forward from the fully open position it is necessary for the pilot to move knob 192 up, thereby pivoting the aft end of lever 185 down. Spring 193 will maintain lever 185 down since it is now acting above the line between pins 194 and 186. However, as the knob 192 moves up, the trip lever 196 also moves up so that the rollers 16 when moving forward will necessarily engage the trip lever 196 forcing it down again and, in turn pushing the lever 185 back into a position wherein it automatically locks the canopy when the latter is again moved to the full open position. In this locked position the trip lever 196 is again moved below a line between pins 194 and 186, thereby permitting the spring 193 to maintain the lever 185 in the engaging position for the next full opening of the canopy.

The aft lock 46 and associated mechanism just described is more fully described and claimed in Patent No. 2,505,651 dated April 25, 1950.

Although the hooks 102 are mechanically releasable from engagement with the sears 110 on the cable fitting 80, any aerodynamic forces acting on the canopy (prior to mechanical release) will not affect the forwardly locked position of the canopy. Therefore, the cockpit enclosure will be positively latched under all flight conditions without being jarred loose. However, due to the pivotal connection (pin 92) between the roller assembly 80 and the cable fitting 82, power movement of the canopy toward the open position will automatically unlatch this safety lock. As seen better in Fig. 8, movement of the actuating cable 26 in the direction of the arrow will produce a force which acts through the moment arm $x$ about the pivot pin 92, thereby imposing a downward movement to the flanges 94 which in the locked position are engaged with the pins 100 on the hooks 102. The downward motion of the flanges 94 will, of course, cause the hooks 102 to rotate downwardly out of engagement with the sears 110 (Fig. 4) on the roller assembly 80 permitting the latter to move rearwardly under power. Relative pivotal motion between the roller assembly 80 and the cable fitting 82 during the automatic unlocking operation is aided by the fact that the plug 86 on the assembly 80 is in communication with the aperture 106 in the plate fitting 19 thereby preventing any downward movement of the forward end of the roller assembly 80. It should be noted that once the canopy is latched in the closed position any play that may exist in the cables between the actuating mechanism and the canopy carrier 20 will not adversely affect the security or operation of the canopy.

A releasing device is provided to permit rapid removal of the canopy from its operating mechanism and the airplane. To this end a handle 200 is provided (Fig. 9) which is attached to one of the outboard sides of the track assembly 18 by means of a bracket 202. This handle is biased by the spring 204 into a normal locked position. The handle 200 is connected by a rod 206 to one arm of a bifurcated bell crank 208 which is pivotally connected to the track 18 adjacent the aft extremity of the latter by a bracket 210 and a pivot pin 212. The free end of the bell crank 208 contains a U-shaped slot 214 which engages the pin 92 when the canopy is moved to the extreme aft position. Since the pin 92 is spring loaded, it will tend to move outwardly from the socket 91 when it reaches the slot 214. In this position, the enlarged head of the pin 92 is readily grasped by the lips forming the slot 214 so that when the handle 200 is rotated, the pin 92 will be completely withdrawn from the socket 91 thereby disengaging the roller assembly 80 from the cable fitting 82. From this point on, the canopy 14 and the roller assembly 80 can be moved farther aft and out of engagement with the ends 216 of the track assembly 18. Prior to complete removal of the canopy 14 and the roller assembly 80, it is necessary that the handle 64 (Fig. 2) be rotated sufficiently so that the eccentric shaft 62 will permit disengagement of the rack 56 from the pinion 54. The disengagement of the rack 56 from the pinion of course will permit free movement of the canopy 14 and the roller assembly 80 beyond the maximum limits of the rack 56.

In operation then, when the pilot wishes to power operate the canopy 14 he moves the electric selector switch 30 which energizes a solenoid valve 31 in order to direct hydraulic or pneumatic pressure to eiher side of the actuating piston of piston assembly 28. The piston will in turn actuate the rack 56 in order to rotate the sprocket 54 and the drums 22 and 24. The rotary motion of the drums is transmitted through the cable 26 to the canopy carrier 20 and the canopy 14 which is rigidly attached thereto. In case the canopy is being moved from the fully closed position to an open position the cable attaching fitting 82 of the canopy carrier 20 will have moments set up therein which will tend to release the safety latching hooks 102 on the spring loaded shaft 104 from the sears 110 on the lower surface of the roller assembly 80 thereby automatically unlocking the safety latch and permitting the aft movement of the canopy.

Should it be desirable to operate the canopy by hand, the pilot moves the handle 162 on the selective control 34 to the manual position thereby transmitting this movement via the control cable 42 to the pivot arm 116 which simultaneously releases the hooks 102 from the roller assembly 80 and opens the by-pass valve 140 to allow free circulation of fluid between the opposite ends of the piston 28. The canopy can then be moved manually fore and aft. The same operation results from movement of the handle 36 which is located on the outer skin surface of the cockpit and which was described heretofore.

Once the canopy is moved to the full open position the aft position lock 46 will have been tripped so that the lever 185 prevents forward movement of the rollers 16 and therefore the lock must be manually released by operation of the control knob 192 by the occupant before either power or hand movement of the canopy can be effected toward the closed position.

It will be understood, of course, that the canopy can be hydraulically held in any intermediate position between the fully opened and fully closed positions by returning the two-way electrical switch 30 to its neutral position after a desired power movement of the canopy has been effected.

As a result of this invention it is readily apparent that a simple rugged and compact mechanism has been provided for hand or power operation of an aircraft cockpit enclosure.

Further a mechanism has been provided which positively safety locks the canopy in the fully closed or open position so that hard landings, buffeting, or other similar flight conditions will not jar the canopy loose from either of the aforementioned positions.

Additionally, a canopy is provided which can be firmly secured in any intermediate position between the fully closed and open stations.

Although only one embodiment of this invention has been described and shown in the accompanying drawings, it will be evident that various changes and modifications can be made without materially departing from the scope of this novel concept.

What it is desired by Letters Patent is:

1. In an airplane having a cockpit, the combination of a sliding canopy for said cockpit, mechanism for locking said canopy in any adjusted position thereof including pilot controlled power operated reciprocating mechanism for moving said canopy between open and closed positions, manually operated means for disabling said power operated reciprocating mechanism to permit manual movement of said canopy, means for safety locking said canopy in its closed position comprising cooperating detent means carried by said airplane and said canopy, and releasing means connected to said manually operated disabling means and actuated in response to operation of the same for disengaging said detent means.

2. In an airplane having a cockpit, the combination of a sliding canopy for said cockpit, mechanism for locking said canopy in any adjusted position thereof including a pilot controlled hydraulic strut for moving said canopy between open and closed positions, means for safety locking said canopy in its closed position comprising cooperating detent means on said airplane and canopy, an operative cable connection between said mechanism and said detent means whereby the latter is automatically released upon initial operation of said hydraulic strut, and manually operated means for disabling said strut and said safety locking means to permit manual movement of said canopy.

3. In an airplane having a cockpit, the combination of a sliding canopy for said cockpit, mechanism for locking said canopy in any adjusted position thereof including pilot controlled hydraulic strut means for moving said canopy between open and closed positions, latch means for safety locking said canopy in its closed position, means responsive to movement of said canopy out of closed position by said hydraulic strut means for unlocking said safety locking means including an operative connection between said mechanism and said latch means, and mechanism for conditioning said canopy for manual operation including manually operated means for disabling said strut means and said safety locking means.

4. In a safety locking mechanism for a cockpit sliding canopy to cover the cockpit of an airplane, a carrier slidably mounted in said cockpit, said carrier comprising an upper assembly connected to said canopy and a lower assembly pivotally connected to said upper assembly, a support for said lower assembly mounted on said airplane, a power source having a cable connected to said lower assembly for first pivoting the latter on said support and for subsequently effecting linear motion thereof, latch mechanism in said cockpit cooperating with said upper assembly for securing said carrier against linear movement, and means for releasing said latch mechanism to permit movement of said carrier in response to movement of said cable by said power source including means on said lower assembly responsive to pivotal movement of the latter by said cable for operating said latch mechanism.

5. In a safety locking mechanism for a sliding canopy to cover the cockpit of an airplane a power source, a canopy carrier, said carrier comprising a roller assembly having the canopy connected thereto and a cable attaching member pivotally connected to said assembly, a cable connecting said power source to said member at a point spaced from said pivotal connection for pivoting said member and thereafter transmitting motion to said carrier, cooperating detent means mounted on said airplane and on said assembly for securing said carrier in locked position against external forces acting on said canopy, and abutment means on said member spaced from said pivotal connection and responsive to pivotal movement of said member by said power source for releasing said cooperating detent means.

6. In a safety locking mechanism for a sliding enclosure to cover the cockpit of an airplane, a carrier assembly connected to said enclosure and slidably mounted on said airplane for carrying said enclosure between fully opened and closed positions, said assembly comprising upper and lower pivotally connected members, power operated reciprocating mechanism connected to said lower member for moving said assembly, latch mechanism mounted on said airplane, a detent on said upper member, cooperating guide elements on said latch mechanism and on said lower member for engaging said detent with said latch mechanism when said enclosure is moved to its fully closed position, and an operative cable connection between said reciprocating mechanism and said lower member for tilting the same whereby said detent is disengaged from said latch mechanism during initial operation of said reciprocating mechanism.

JOHN R. CLARK.
ROLAND CHRISTY.

REFERENCES CITED

The following references are of record in the file of this patent:

UNITED STATES PATENTS

| Number | Name | Date |
|---|---|---|
| 1,799,145 | Bischof | Apr. 7, 1931 |
| 1,874,465 | Davis | Aug. 30, 1932 |
| 2,116,446 | Nishimura | May 3, 1938 |
| 2,280,368 | Bassett | Apr. 21, 1942 |
| 2,424,245 | Martin | July 22, 1947 |
| 2,482,004 | King | Sept. 13, 1949 |

FOREIGN PATENTS

| Number | Country | Date |
|---|---|---|
| 556,284 | Great Britain | Sept. 28, 1943 |
| 562,808 | Great Britain | July 17, 1944 |